R. RUSSELL.
CASTING HARNESS.
APPLICATION FILED NOV. 18, 1912.
1,084,169.
Patented Jan. 13, 1914.
2 SHEETS—SHEET 1.
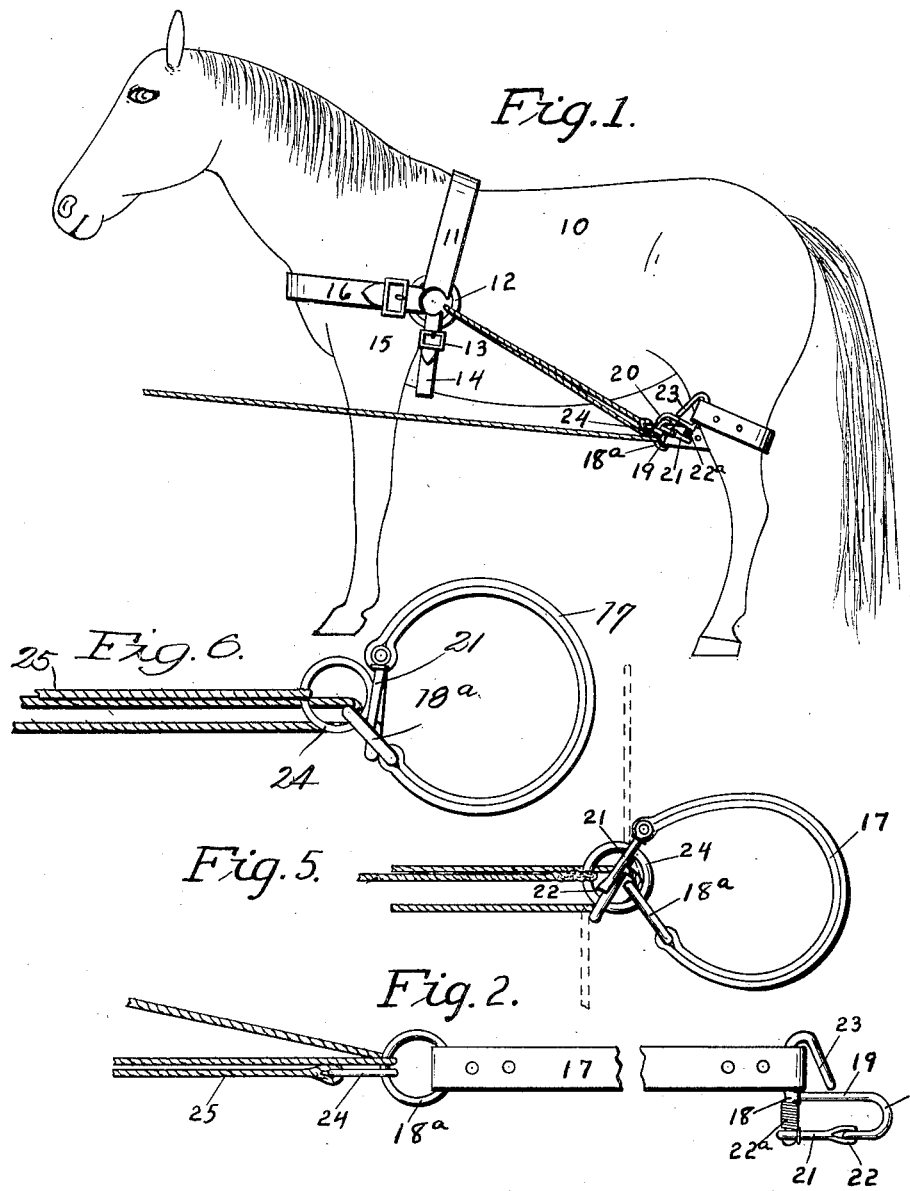
WITNESSES:
L. C. Paley
A. G. Hague
INVENTOR.
Raymond Russell
BY
Orwig Bair
ATTORNEYS

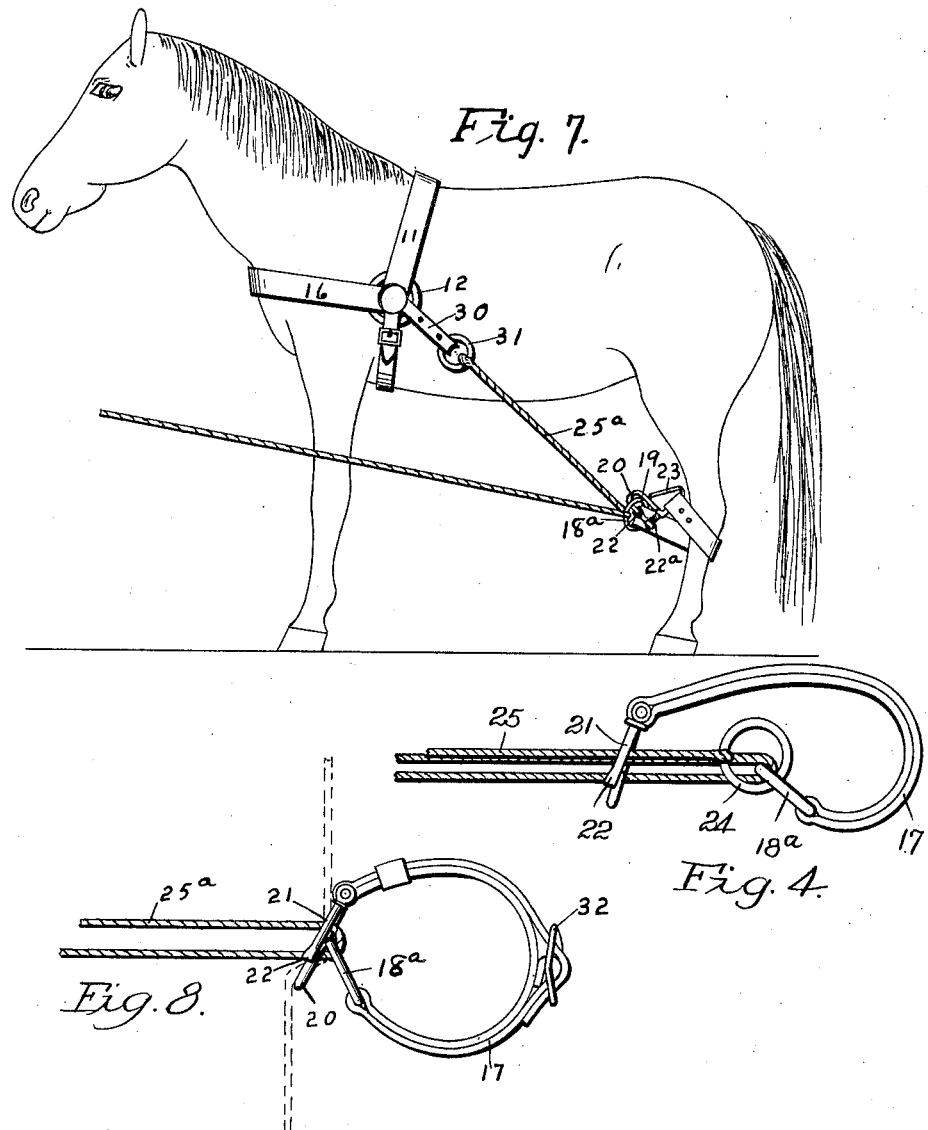

UNITED STATES PATENT OFFICE.

RAYMOND RUSSELL, OF UNION, IOWA.

CASTING-HARNESS.

1,084,169.  Specification of Letters Patent.  Patented Jan. 13, 1914.

Application filed November 18, 1912. Serial No. 732,082.

*To all whom it may concern:*

Be it known that I, RAYMOND RUSSELL, a citizen of the United States, residing at Union, in the county of Hardin and State of Iowa, have invented certain new and useful Improvements in Casting-Harness, of which the following is a specification.

The object of my invention is to provide a casting harness for horses, cattle and other animals, which harness is of simple, durable and inexpensive construction, and which is so constructed and arranged that it can be secured to the animal in such a way that the animal cannot shake or kick the harness off.

A further object is to provide such a harness, so constructed and arranged that the part mounted on the body and breast of the horse will be held substantially in the same position while the harness is in use.

A further object is to provide such a harness, so constructed and arranged that the hind leg or foot of the animal can be firmly and securely fastened by an operator when at a considerable distance from the foot or leg.

A further object is to provide such a harness to include a fastening device, which can be mounted on ropes in front of the animal's hind leg and slid rearwardly until it automatically engages a ring, thereby fastening a loop or band around the animal's leg, which fastening device is capable of being operated by a person standing at the side of the animal and in front of the hind leg and at a safe distance therefrom.

A further object is to provide such a loop or band and a fastening device which may be used with a casting harness or on an operating table.

My invention consists in certain details, in the construction, arrangement, and combination of the various parts of the device, whereby the objects contemplated are attained, as hereinafter set forth, pointed out in my claims and illustrated in the accompanying drawings in which:

Figure 1 shows a side elevation of my improved casting harness on a horse. Fig. 2 shows a top or plan view of a portion of my improved casting harness in its position when allowed to lie on the ground between the hind legs of the animal, it being understood that the ropes would be twisted and the strap would lie flat on the ground. Fig. 3 shows a top or plan view of the last mentioned portion of the harness when it is picked up, ready to loop around the leg of the animal and to secure the fastening device to the ropes. Fig. 4 shows a top or plan view of a part of my casting harness after the fastening device has been secured to the ropes and as it is being slid rearwardly. Fig. 5 shows a similar view with the operation of securing the hind leg further completed, and dotted lines showing the position of two of the ropes in shoving the fastening device rearwardly. Fig. 6 shows a portion of the casting harness with the fastening device in position for holding the leg, and Fig. 7 shows a slightly modified form of my device and Fig. 8 shows a modified form of the loop which goes around the animal's leg.

In the accompanying drawings, I have used the reference numeral 10 to indicate an animal on which my improved casting harness is used.

My improved casting harness includes a back band 11 intended to go over the body of the animal just back of the shoulder, as shown in Fig. 1. Secured to each end of the back band is a ring 12. Secured to the rings 12, by means of buckles 13, is a belly band 14. Secured to the rings 12 by means of buckles 15 is a breast band 16. It will be seen that the portion of my improved casting harness above described is adjustable at several points to fit any ordinary sized animal.

The portion of my improved casting harness by which the hind legs of the animal are held and secured to the portion of the casting harness already described will now be described in detail.

I provide a strap 17 which may be made of leather, webbing or any suitable material of suitable length to surround the hind leg of the animal. Secured to one end of the strap 17 is a ring 18ᵃ. The other end of the strap 17 is preferably formed into a loop. Mounted in said loop is a fastening device comprising a bar 18, loosely mounted in said loop and extending considerably beyond the same on one side.

Extending away from the bar 18, at right angles thereto is a hook member having a straight portion 19 and a U shaped portion 20, the free end of the U shaped portion 20 being parallel to and spaced apart from the straight portion 19. On the end of the bar 18, spaced apart from the strap 17 is rotatably mounted an arm 21 having a spoon shaped end 22 designed to receive and engage the free end of the U shaped portion 20. Mounted on the bar 18 and secured to the arm 21 is a contractible coil spring 22$^a$ designed to hold the spoon shaped portion 22 of the arm 21 in engagement with the free end of the U shaped portion 20. The free end 23 of the bar 18 is designed to be bent around adjacent to the portion 19, as shown in Fig. 2. The bar 18, the portions 23, 19 and 20 and the arm 21 normally rest in the same plane. Linked in the ring 18$^a$ is a ring 24 secured to which is a rope or other similar flexible device 25. In using my improved casting harness, I preferably extend the rope 25 through the ring 12 and then again through the ring 18. It will be understood that the arrangement of the rope thus described is illustrative and the rope could be secured to the ring 12 and simply extended once through the ring 18$^a$. The arrangement described and shown gives me the effect of a block and tackle, enabling me to control the animal with less exertion of strength. The ropes being secured on each side of the animal to the rings 12, as above described, are then allowed to drop flat on the ground and the animal is led or moved until the ropes and the strap 17 are stretched out between the legs of the animal and extend to a considerable distance behind it. The strap 17 is then picked up and brought around the leg from the inside to the outside and then forwardly and the fastening device is snapped over the three portions of the rope shown in Fig. 4. The operator then seizes two portions of the rope 25 extending forwardly on each side of the ring 18$^a$ and pulls them apart, thereby sliding the fastening rearwardly. When the ropes are taut, the ring 24 will naturally rest in a plane at right angles to the ring 18$^a$, as clearly shown in Figs. 4, 5 and 6. As the fastening device is slid rearwardly, it passes from the ring 24 and the portions of the rope on each side of the ring 18$^a$ are drawn to the position shown by the dotted lines in Fig. 5. These portions of the rope force the fastening device rearwardly until the arm 21 engages the ring 18$^a$. The portion 19 and the U shaped portion 20 slip over the ring 18$^a$ until the spoon shaped portion 22 of the arm 21 slips from said ring and snaps back into position, as shown in Fig. 6. If desired, an additional strap 30 may be secured to each ring 12 and a ring 31 secured to the free end of each strap 30. In that case the ring 24 is dispensed with and the rope 25$^a$ may be secured to the ring 31. The rope 25$^a$ is then extended through the ring 18$^a$ and the fastening device may be snapped over the two portions of the rope 25$^a$ and slid toward the ring 18$^a$ till it snaps into position. The leg may then be drawn close to the body and the fastening device may be snapped to the ring 31 by manual manipulation.

The strap 17 may be provided with a buckle 32 for adjusting the length of said strap. The strap 17, the ring 18$^a$ and fastening device may be readily used on an operating table and secured to the hobble straps.

It will readily be seen that the harness and especially the fastening device and strap 17 may be used in many other ways.

The advantages of the construction and arrangement of my improved casting harness are largely seen from the foregoing description. The portions 11, 14 and 16 hold the front part of the harness in proper position and are readily adjusted to various sized animals. On account of the construction and arrangement of the rope 25, the strap 17 and the parts connected therewith, the catch devices may be snapped from the parts of the rope and slid rearwardly until it engages the ring 18$^a$ without any necessity for the operator's getting into dangerous proximity to the hind leg of the animal. In casting a colt or a steer, or the like, for any kind of surgical treatment, there is often considerable danger, especially in fastening the loop or the like to the animal's hind leg. This danger is almost wholly avoided by the use of my improved fastening device and the other parts of my casting harness.

It will be understood that when the strap 17 is once secured in position on the animal's leg, the leg can be drawn forward for throwing the animal.

Any suitable material may be used in the construction of my casting harness and the details of its construction may be varied in many particulars, it being my intention to claim and cover any form of construction set forth in the appended claims.

I claim as my invention:

1. In a device of the class described, a harness portion designed to be secured to the body of an animal, a looped portion designed to engage the leg of the animal, a ring at one end of said looped portion, a rope secured to said harness portion and extending through said ring and a fastening device secured to the other end of said looped portion and constructed and arranged to be detachably secured to said rope at a point spaced apart from the leg of the animal and to be slid along said rope and to be engaged with said ring, for securing the two ends of said looped portion together.

2. In a device of the class described, a harness portion designed to be secured to the body of an animal, said harness portion carrying a ring, a looped portion designed to engage the leg of the animal, a second ring at one end of said looped portion, a third ring linked to said second ring, a rope secured to said third ring and extending through said harness ring, then through said second ring, and a fastening device secured to the other end of said looped portion and constructed and arranged to be detachably secured to said rope at a point spaced apart from the leg of the animal and to be slid along said rope and caused to engage and hold said second ring.

Des Moines, Iowa, Nov. 6, 1912.

RAYMOND RUSSELL.

Witnesses:
M. WALLACE,
S. ROBINSON.

Copies of this patent may be obtained for five cents each, by addressing the "Commissioner of Patents, Washington, D. C."